United States Patent [19]

Gutleber

[11] Patent Number: 4,599,733
[45] Date of Patent: Jul. 8, 1986

[54] MULTILEVEL NOISE CODE MATE PAIR GENERATION AND UTILIZATION OF SUCH CODES

[75] Inventor: Frank S. Gutleber, Little Silver, N.J.

[73] Assignee: The United States of America as represented by the Secretary of the Army, Washington, D.C.

[21] Appl. No.: 533,183

[22] Filed: Sep. 19, 1983

[51] Int. Cl.[4] .................................. H04B 14/04
[52] U.S. Cl. ............................ 375/25; 375/2.1; 375/2.2; 375/34; 455/26
[58] Field of Search ................ 455/26, 30; 375/2.1, 375/2.2, 60, 34, 38, 25; 340/348

[56] References Cited

U.S. PATENT DOCUMENTS

| | | | |
|---|---|---|---|
| 3,461,451 | 8/1969 | Gutleber | 340/348 |
| 3,519,746 | 7/1970 | Gutleber | 370/18 |
| 3,634,765 | 1/1972 | Gutleber | 375/34 |
| 4,293,953 | 10/1981 | Gutleber | 375/25 |
| 4,455,662 | 6/1984 | Gutleber | 375/25 |
| 4,471,342 | 9/1984 | Gutleber | 375/38 |
| 4,511,885 | 4/1985 | Gutleber | 375/34 |
| 4,512,024 | 4/1985 | Gutleber | 375/34 |
| 4,514,853 | 4/1985 | Gutleber | 375/60 |

Primary Examiner—Salvatore Cangialosi
Assistant Examiner—Aaron J. Lewis
Attorney, Agent, or Firm—Anthony T. Lane; Jeremiah G. Murray; Paul A. Fattibene

[57] ABSTRACT

Noise codes are generated of a type termed "code mates" having correlation functions which, upon detection in a matched filter, provide an impulse autocorrelation function. More particularly, code mate pairs of at least two code bits each are generated and shown, for purposes of illustration, utilized in a communications system and wherein one code mate is comprised of two signal bits of first and second or opposite polarity, one bit of which has a larger amplitude than the other bit and wherein the other code mate is comprised of two signal bits of said second polarity, one bit of which has a like larger amplitude than the other bit.

18 Claims, 6 Drawing Figures

MULTILEVEL NOISE CODE MATE PAIR GENERATION AND UTILIZATION OF SUCH CODES

The invention described herein may be manufactured, used and licensed by or for the Government for governmental purposes without the payment of any royalties thereon or therefor.

FIELD OF THE INVENTION

This invention relates generally to the generation of noise codes and more particularly to the generation and utilization of multilevel noise code mate pairs having autocorrelation functions which upon detection in a matched filter and addition compress to a lobeless impulse.

BACKGROUND OF THE INVENTION

The concept of generating and communicating with noise codes of the type termed "code mates" having autocorrelation functions which upon detection in a matched filter provide an impulse autocorrelation function is generally known and shown, for example, in U.S. Pat. No. 3,519,746, entitled, "Means And Method To Obtain An Impulse Autocorrelation Function", which issued to Frank S. Gutleber, the present inventor, on July 7, 1970. Other examples include U.S. Pat. No. 3,634,765, entitled, "System To Provide An Impulse Autocorrelation Function Upon Linear Addition . . .", which issued to Frank S. Gutleber on Jan. 11, 1972, and U.S. Pat. No. 4,293,953, entitled, "Bi-Orthogonal PCM Communication System Employing Multiplexed Noise Codes", which issued to Frank S. Gutleber, on Oct. 6, 1981. It is to this type of apparatus to which the present invention is generally directed.

Accordingly, it is an object of the present invention to provide an improvement in the generation and utilization of noise codes.

Another object of the invention is to provide an improvement in noise codes comprised of code mate pairs having autocorrelation functions which upon detection in a matched filter compress to an impulse.

Still another object of the invention is to provide multiplexed code mate pairs having more than one amplitude level.

These and other objects are achieved by multiplexed noise code mate pairs comprising a pair of bi-polar digital noise code mates having more than one amplitude level. Generated and utilized are code mate pairs of at least two code bits each wherein one code mate is comprised of two signal bits of first and second polarities, one bit of which has a larger amplitude than the other bit and wherein the other code mate is comprised of two signal bits of said second polarity, one bit of which has a like larger amplitude than the other bit. For example, where one code mate comprises a code a=1, $0^K$, the other code mate comprises a code b=$0^K$, 0 or 0, $0^K$ and where K is an amplitude multiplying term, 0 represents a positive pulse of unit amplitude and 1 represents a negative pulse of unit amplitude.

DESCRIPTION OF THE PREFERRED EMBODIMENT

Figure 1:
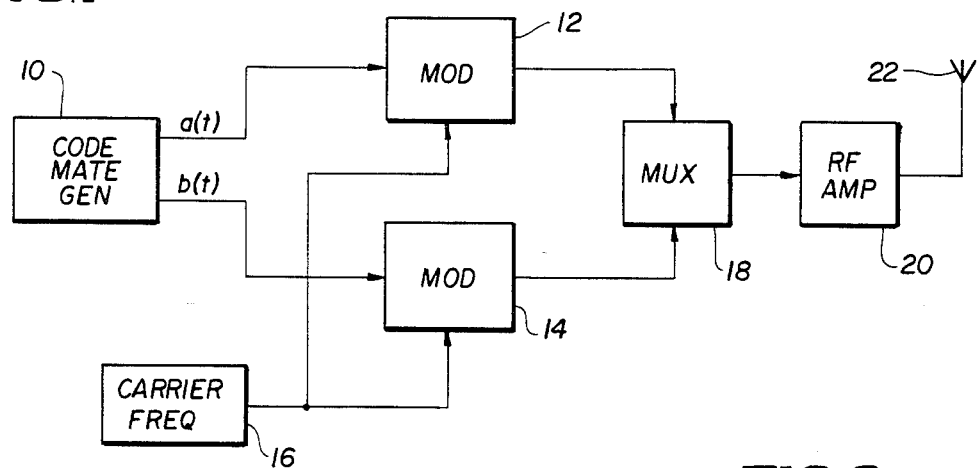
FIG. 1 is a functional block diagram illustrative of the transmitter apparatus of a typical noise modulated communications system utilizing a pair of code mates generated in accordance with the principles of this invention.

The present invention is directed to digital codes referred to as noise codes, meaning that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are multiplexed, matched filter detected and linearly added, there is provided a lobeless impulse output of relatively high amplitude at one given time ($\tau=0$) and a zero output at all other times ($\tau \neq 0$). Mathematically, for a pair of code mates a and b, $$\theta_a(\tau) = -\theta_b(\tau) \quad (1)$$

for all $\tau \neq 0$ where $\theta_a(\tau)$ is the autocorrelation function of code a, $\theta_b(\tau)$ is the autocorrelation function of code b, and where $\tau=0$ is the location of the main lobe.

The present invention is furthermore directed to the generation and utilization of a set of multilevel code mate pairs which meets the requirement of equation (1) and wherein the code set comprises a basic or kernel mate pair consisting of at least two code bits, wherein one code mate is comprised of signal bits having opposite polarities but one bit has a larger amplitude than the other bit and wherein the other code mate is comprised of two signal bits of the same polarity as the second bit of the first code mate but with one bit of the second code mate having a larger amplitude than the other bit and having the same amplitude as the larger amplitude code bit of the first code mate.

Four code mate pairs having the property of the aforesaid kernel mate pairs is tabulated below in Table I as:

TABLE I

| Code a | Code b |
|---|---|
| 1,$0^K$ | $0^K$,0 |
| 1,$0^K$ | 0,$0^K$ |
| $1^K$,0 | $0^K$,0 |
| $1^K$,0 | 0,$0^K$ | where 0 denotes a pulse of unit amplitude and positive polarity, 1 denotes a pulse of unit amplitude and negative polarity, the exponent K signifies an amplitude multiplying factor, i.e. $0^K$=a positive polarity signal multiplied by K, and wherein the comma signifies that the second bit of each code mate follows the first code mate and having a delay ($\tau$) which can be of any value equal to or greater than the code bit width of the first bit.

The following demonstration will illustrate that the code mates set forth in Table I satisfy (1) and compress to a lobeless impulse. Consider, for example, the following code mate pairs a and b:

$$a = 1, 0^K \text{ and } b = 0^K, 0$$

The autocorrelation function $\theta_a(\tau)$ of code a can be obtained in a well known fashion by detection in a matched filter comprised of, for example, a combination of time delay circuits, phase control circuits, and a linear adder, a typical example being shown and described in applicant's prior U.S. Pat. No. 4,293,953, referenced above. Such a matched filter detector develops a digital sequence $\theta_a(\tau)$ which can be illustrated as:

$$\theta_a(\tau) = \frac{\begin{array}{cc} 1^K\,0^{K2} & \\ 0 & 1^K \end{array}}{1^K\,0^{(K2+1)}\,1^K} \quad (2)$$
$$\underset{\tau = 0}{\uparrow}$$

As shown in equation (2), the main lobe ($\tau=0$) comprises a positive pulse having an amplitude factor of $K^2 + 1$.

In the same manner, the autocorrelation function $\theta_b(\tau)$ of code b can be developed in a corresponding matched filter detector in the following fashion:

$$\theta_b(\tau) = \frac{\begin{array}{cc} 0^K\,0 & \\ 0^{K2} & 0^K \end{array}}{0^K\,0^{(K2+1)}\,0^K} \quad (3)$$
$$\underset{\tau = 0}{\uparrow}$$

From equations (2) and (3), it can be seen that $\theta_a(\tau) = -\theta_b(\tau)$ for all $\tau \neq 0$, and furthermore, when added together, compress to a lobeless impulse at $\tau=0$ when linearly added together. This is shown below as:

$$\begin{array}{r} \theta_a(\tau) = 1^K\,0^{(K2+1)}\,1^K \\ \theta_b(\tau) = 0^K\,0^{(K2+1)}\,0^K \\ \hline \theta_t(\tau) = \phantom{.}0^{2(K2+1)}\phantom{.} \end{array} \quad (4)$$
$$\underset{\tau = 0}{\uparrow}$$

Similarly, for code mate pairs a and b where:

$$a = 1, 0^K \text{ and } b = 0, 0^K$$

The autocorrelation function $\theta_a(\tau)$ of code a is provided as follows:

$$\theta_a(\tau) = \frac{\begin{array}{cc} 1^K\,0^{K2} & \\ 0 & 1^K \end{array}}{1^K\,0^{(K2+1)}\,1^K} \quad (5)$$
$$\underset{\tau = 0}{\uparrow}$$

In a like manner, compressing code b provides an output $\theta_b(\tau)$ which is developed as:

$$\theta_b(\tau) = \frac{\begin{array}{cc} 0^K\,0^{K2} & \\ 0 & 0^K \end{array}}{0^K\,0^{(K2+1)}\,0^K} \quad (6)$$
$$\underset{\tau = 0}{\uparrow}$$

The addition of $\theta_a(\tau)$ and $\theta_b(\tau)$ of equations (5) and (6) provides a composite signal $\theta_t(\tau)$ which provides a lobeless impulse at $\tau=0$ and comprises:

$$\begin{array}{r} \theta_a(\tau) = 1^K\,0^{(K2+1)}\,1^K \\ \theta_b(\tau) = 0^K\,0^{(K2+1)}\,0^K \\ \hline \theta_t(\tau) = \phantom{.}0^{2(K2+1)}\phantom{.} \end{array} \quad (7)$$
$$\underset{\tau = 0}{\uparrow}$$

Consider now a third set of code mates where:

$$a = 1^K, 0 \text{ and } b = 0, 0^K$$

Compression of code a with a matched filter in this instance provides an output $\theta_a(\tau)$ as follows:

$$\theta_a(\tau) = \frac{\begin{array}{cc} 1^K\,0 & \\ 0^{K2} & 1^K \end{array}}{1^K\,0^{(K2+1)}\,1^K} \quad (8)$$
$$\underset{\tau = 0}{\uparrow}$$

In a like manner, compressing code b provides an output $\theta_b(\tau)$ which is developed as:

$$\theta_b(\tau) = \frac{\begin{array}{cc} 0^K\,0^{K2} & \\ 0 & 0^K \end{array}}{0^K\,0^{(K2+1)}\,0^K} \quad (9)$$
$$\underset{\tau = 0}{\uparrow}$$

The addition of $\theta_a(\tau)$ provides a composite signal $\theta_t(\tau)$ which provides a lobeless impulse signal at $\tau=0$ in the following manner:

$$\begin{array}{r} \theta_a(\tau) = 1^K\,0^{(K2+1)}\,1^K \\ \theta_b(\tau) = 0^K\,0^{(K2+1)}\,0^K \\ \hline \theta_t(\tau) = \phantom{.}0^{2(K2+1)}\phantom{.} \end{array} \quad (10)$$
$$\underset{\tau = 0}{\uparrow}$$

For the fourth code mate set where:

$$a = 1^k, 0 \text{ and } b = 0^K, 0$$

The matched filter compression of code a provides an output $\theta_a(\tau)$ as follows:

$$\theta_a(\tau) = \frac{\begin{array}{cc} 1^K\,0 & \\ 0^{K2} & 1^K \end{array}}{1^K\,0^{(K2+1)}\,1^K} \quad (11)$$
$$\underset{\tau = 0}{\uparrow}$$

Compressing code b provides an output $\theta_b(\tau)$ which becomes:

$$\theta_b(\tau) = \frac{0^K \, 0}{0^K \, 0^{(K2+1)} \, 0^K} \quad (12)$$
$$\uparrow_{\tau = 0}$$

As before, the addition of $\theta_a(\tau)$ and $\theta_b(\tau)$ provides a composite signal $\theta_t(\tau)$ which provides a lobeless impulse at $\tau=0$ in the following manner:

$$\begin{aligned}\theta_a(\tau) &= 1^K \, 0^{(K2+1)} \, 1^K \\ \theta_b(\tau) &= 0^K \, 0^{(K2+1)} \, 0^K \\ \hline \theta_t(\tau) &= . \quad 0^{2(K2+1)} . \end{aligned} \quad (13)$$
$$\uparrow_{\tau = 0}$$

From the above, it is readily apparent that all of the code pairs set forth in Table I meet the requirements of equation (1) for forming a code mate pair. Furthermore, the basic or kernel set of code mates can be utilized with any code expansion process such as butting, interleaving, partial interleaving, or overlapping to yield multiplexed expanded codes of any desired length.

As an example, one of the code mate pairs set forth in Table I, i.e. $a=1$, $0^K$ and $b=0^K$, 0 will be expanded by interleaving, where code a is interleaved with code b to form one code of an expanded mate pair, while the other mate to the expanded code is obtained by interleaving the negative of code b with code a. This is expressed mathematically as:

$$A = a \, I \, b \quad (14)$$

$$B = a \, I \, \overline{b} \quad (15)$$

where
A and B represent the expanded mate pair
I represents the process of interleaving, and
$\overline{b}$ represents the complement or negative of code b, i.e., 1011 becomes 0100.

Accordingly, $$A = 1 \, 0^K \, 0^K \, 0 \text{ and } B = 1 \, 1^K \, 0^K \, 1$$

The autocorrelation functions of expanded codes A and B are now developed as:

$$\theta_A(\tau) = \begin{array}{r} 1 \, 0^K \, 0^K \, 0 \\ 1^K \, 0^{K2} \, 0^{K2} \quad 0^K \\ 1^K \, 0^{K2} \quad 0^{K2} \, 0^K \\ 0 \quad 1^K \, 1^K \, 1 \\ \hline 1 \, . \, 0^{K2} \, 0^{2(K2+1)} \, 0^{K2} \, . \, 1 \end{array} \quad (16)$$
$$\uparrow_{\tau = 0}$$

and $$\theta_B(\tau) = \begin{array}{r} 0 \, 0^K \, 1^K \, 0 \\ 1^K \, 1^{K2} \, 0^{K2} \quad 1 \\ 0^K \, 0^{K2} \quad 1^{K2} \, 0^K \\ 0 \quad 0^K \, 1^K \, 0 \\ \hline 0 \, . \, 1^{K2} \, 0^{2(K2+1)} \, 1^{K2} \, . \, 0 \end{array} \quad (17)$$
$$\uparrow_{\tau = 0}$$

To prove that the expanded code mate pairs meet the requirements for forming a mate pair by satisfying the conditions of equation (1), summing $\theta_A(\tau)$ and $\theta_B(\tau)$ results in a lobeless impulse function as shown below:

$$\begin{aligned}\theta_A(\tau) &= 1 \, . \, 0^{K2} \, 0^{2(K2+1)} \, 0^{K2} \, . \, 1 \\ \theta_B(\tau) &= 0 \, . \, 1^{K2} \, 0^{2(K2+1)} \, 1^{K2} \, . \, 0 \\ \hline \theta_T(\tau) &= \ldots \quad 0^{4(K2+1)} \, . \quad \ldots \end{aligned} \quad (18)$$
$$\uparrow_{\tau = 0}$$

It should be pointed out that this expansion process can be repeated indefinitely to provide a mate code pair of any length desired.

Apparatus for implementing the basic or kernel code mate pairs set forth in Table I as well as a noise modulated pulse communications system employing these codes is disclosed in FIGS. 1 through 3D. Referring first to FIG. 1, reference numeral 10 denotes a code mate generator for generating the aforesaid code mates a and b. These codes are outputted in a time related multibit binary digital sequence as signals a(t) and b(t) which are applied to respective modulator circuits 12 and 14 which additionally have applied thereto a carrier frequency generated by a carrier frequency generator 16. The outputs of the modulators 12 and 14 comprise, for example, separate bi-phase modulated codes which are fed to a multiplexer 18 which operates to either time or frequency multiplex the carrier modulated signal a(t) and b(t). The output of the multiplexer 18 is fed to an RF amplifier 20 where an RF carrier containing the multiplexed codes a and b are radiated from an antenna 22.

Figure 2:
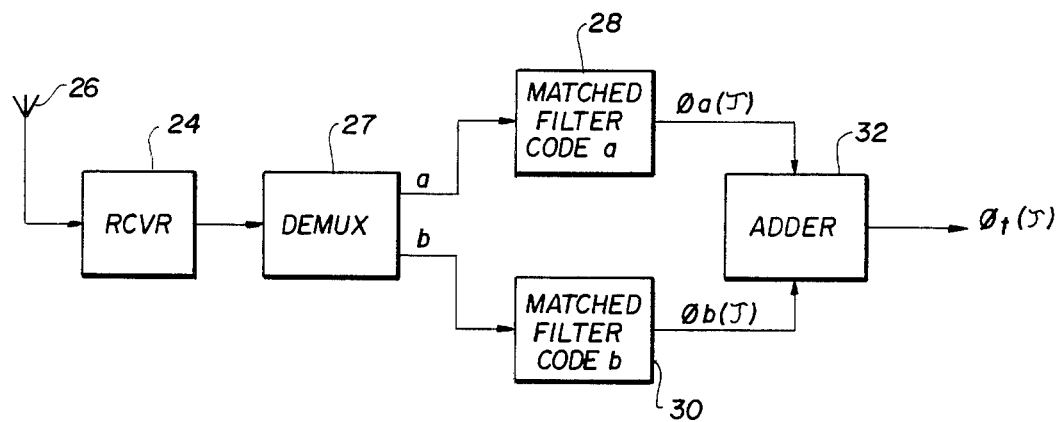
FIG. 2 is a functional block diagram illustrative of the receiver apparatus of the noise modulated communications system for receiving and detecting the code mates generated in accordance with the principles of this invention.

With respect to FIG. 2, there is disclosed receiver apparatus for being responsive to the RF signal radiated from the antenna 22 and containing the codes a and b. Accordingly, radio receiver apparatus 24 is shown coupled to a receiving antenna 26 which is operable to translate the multiplexed codes a and b to an IF frequency, whereupon they are fed to the demultiplexer 27. The demultiplexer is operable to output the codes a and b separately where they are applied to respective matched filters 28 and 30. The matched filters 28 and 30 are typically of the type shown and described in the aforementioned U.S. Pat. No. 4,283,953, and operate to compress the codes a and b as described above to provide respective autocorrelation function outputs $\theta_a(\tau)$ and $\theta_b(\tau)$. The autocorrelation function outputs of matched filters 28 and 30 are applied to a linear adder 32 which is operable to develop a lobeless impulse output signal $\theta_t(\tau)$ in accordance with the foregoing explanation.

While FIGS. 1 and 2 generally disclose a typical prior art transmitter and receiver apparatus utilizing code mate pairs, FIGS. 3A through 3D are illustrative of means for generating each of the four basic or kernel mate pairs set forth in Table I and which are generated, for example, by the code mate generator 10 of FIG. 1.

Figure 3A:
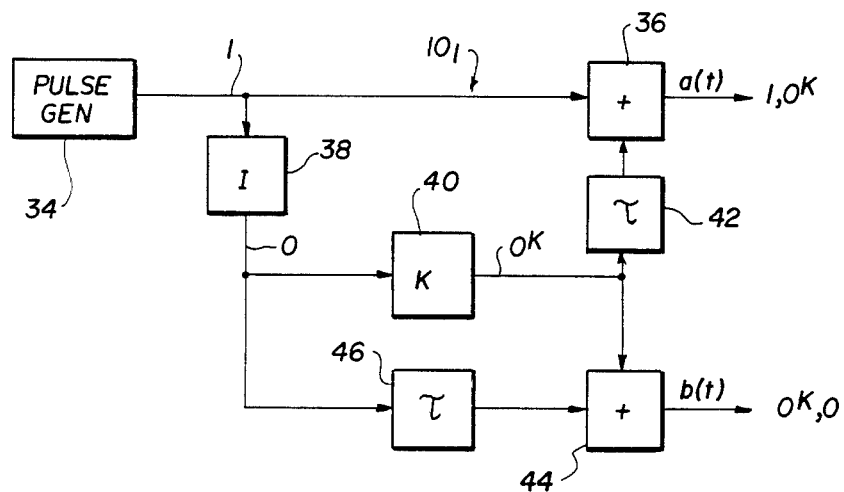
FIG. 3A is a first embodiment of a code mate generator shown in FIG. 1.

Referring first to FIG. 3A, a code mate generator $10_1$ for generating the codes $a=1$, $0^K$ and $b=0^K$, 0 comprises a pulse generator 34 which provides an output of a negative pulse of unit amplitude, i.e., "1" which is fed directly to an adder 36 and a pulse inverter 38 which is operable to output a positive pulse of unit amplitude, i.e., a "0". The 0 output from the inverter 38 is fed to an amplification stage 40 which provides an output of $0^K$. This signal is applied to the adder 36 through a time delay circuit 42 which provides a time delay of $\tau$, whereupon the output of the adder 36 comprises the signal $a(t) = 1, 0^K$. The output of the pulse amplifier 40 is also fed to a second linear adder 44 which also has applied thereto the output of the pulse inverter 38 through a second $\tau$ time delay circuit 46 whereupon the adder 44 outputs a signal $b(t) = 0^K, 0$.

Figure 3B:
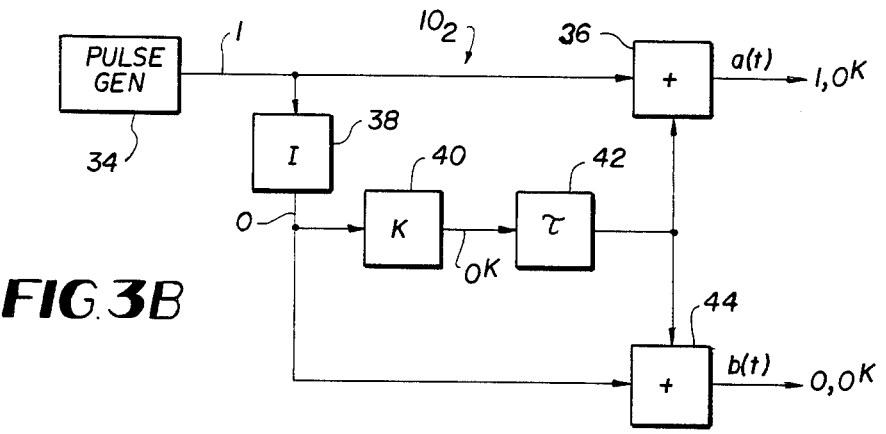
FIG. 3B is a second embodiment of the code mate generator shown in FIG. 1.

With respect to a configuration of FIG. 3B, it comprises a code mate generator $10_2$ which is adapted to generate the code mates $a = 1, 0^K$ and $b = 0, 0^K$. Further, as shown, a pulse generator 34 providing a code bit output of 1 is coupled to the linear adder 36 as before as well as to the pulse inverter 38. The pulse amplifier 40 is also included; however, only a single pulse time delay circuit 42 is employed, the output of which is commonly applied to the first linear adder 36 as well as a second linear adder 44. It can be seen that the output of the first adder 36 comprises a signal $a(t) = 1, 0^K$, whereas the output of the second linear adder 44 comprises a signal $b(t) = 0, 0^K$.

Figure 3C:
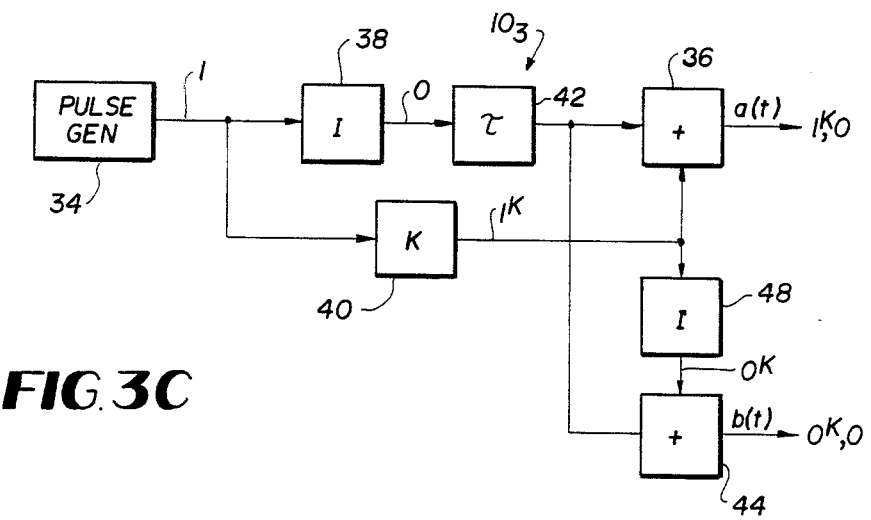
FIG. 3C is a third embodiment of the code mate generator shown in FIG. 1.

Referring now to FIG. 3C, there is disclosed a code mate generator $10_3$ for generating the code $a = 1^K, 0$ and $b = 0^K, 0$. In this circuit configuration, the pulse generator 34 as before, outputs the 1 code bit. This code bit is now directly applied to a pulse inverter 38 and pulse amplifier 40, which respectively output a 0 and $1^K$ code bit. The output of the pulse amplifier 40 is fed to the adder 36 for generating the first code bit of code a while the second code bit is developed by the output of the pulse inverter 38 being applied to the adder 36 via a $\tau$ time delay circuit 42. And thus the signal $a(t) = 1^K, 0$ appears at the output of the adder 36. A second pulse inverter 48 is now employed by being coupled to the output of the pulse amplifier 40, whereupon the $1^K$ code bit is converted to $0^K$ which is applied to the second adder 44. In this circuit configuration, the adder 44 is also coupled to the delayed 0 code bit by the time delay circuit 42 whereupon the linear adder 44 outputs the signal $b(t) = 0^K, 0$.

Figure 3D:
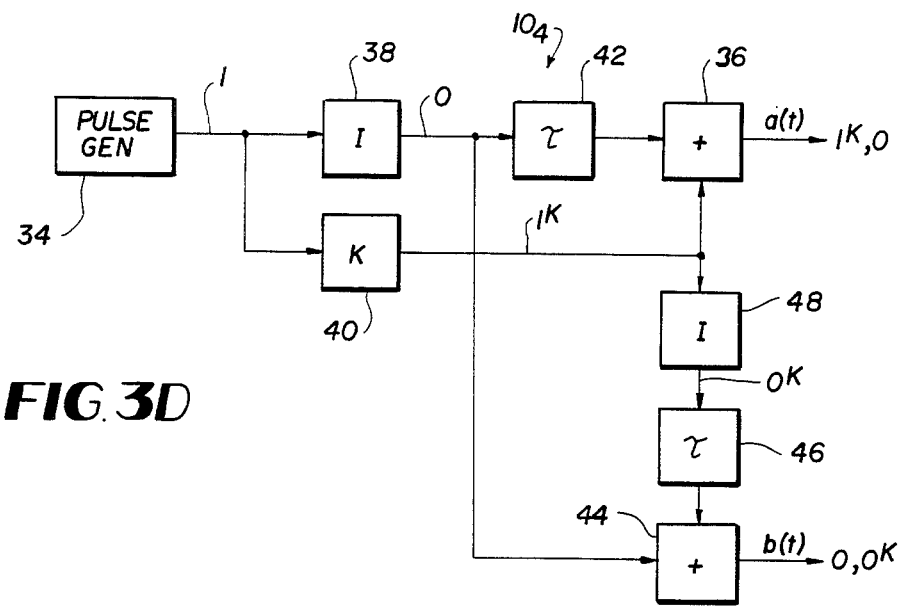
FIG. 3D is a fourth embodiment of the code mate generator shown in FIG. 1.

Considering now the last and final FIG. 3D, shown therein is a circuit configuration for developing the code mates $a = 1^K, 0$ and $b = 0, 0^K$. This circuit configuration is similar to that shown in FIG. 3C, with the exception that a second $\tau$ time delay circuit 46 is interposed between the inverter 48 and the second adder 44. As in the embodiment shown in FIG. 3C, the output of the adder 36 comprises a signal $a(t) = 1^K, 0$. With the code bit $0^K$ being delayed and applied to the second linear adder 44 along with the 0 code bit output from the inverter 38, it can be seen that the output of the adder 44 comprises the signal $b(t) = 0, 0^K$.

Accordingly, what has been shown and described is a set of multi-level basic or kernel code mate pairs which when utilized in a communications system have autocorrelation functions which upon detection in a matched filter compress to a lobeless impulse. However, these noise codes can, when appropriately utilized, improve the entire field of communications for in a broad sense they are capable of optimizing all transmission systems including not only communications systems, but also multiple access systems, radar systems, altimeters, fuzes, missile guidance, navigation, traffic control, etc. by reducing self interference, providing anti-jam (A/J) protection, low probability of intercept (LPI) as well as providing increased range and velocity resolution and their measurement accuracy.

While the foregoing has been shown by way of illustration, it should be noted that it should not be considered in a limiting sense since all modifications, alterations and changes coming within the spirit and scope of the invention as set forth in the following claims are herein meant to be included.

I claim:

1. A method of generating a code mate pair of multi-bit digital codes of at least two code bits each, comprising the steps of:
   generating four separate code bits each of a first or second polarity, said code bits comprising the same first amplitude and occuring in undelayed or mutual time coincidence;
   selectively amplifying two of said four code bits by a predetermined signal gain having a real number amplitude multiplying factor other than one to provide two amplified code bits;
   selectively delaying at least two of said code bits each by a time delay at least equal to the code bit width of the other code bit to provide two delayed code bits; and
   thereafter selectively combining said four code bits into a first code mate including an undelayed code bit and a delayed code bit and wherein one code bit is comprised of an amplified code bit and the other code bit comprises a said first amplitude code bit, and a second code mate including an undelayed code bit and a delayed code bit and wherein one code bit is comprised of an amplified code bit and the other code bit comprises a first amplitude code bit.

2. The method of claim 1 wherein said first code mate includes code bits of mutually opposite polarity and wherein said second code mate includes code bits of the same polarity.

3. The method of claim 2 wherein the code bits of said second code mate are of the same polarity as the delayed code bit of the first code mate.

4. The method of claim 1 wherein said combining step further comprises combining said four code bits into a first code mate including an undelayed code bit and a delayed code bit of mutually opposite polarity and wherein one code bit is comprised of an amplified code bit and the other code bit comprises a first amplitude code bit, and a second code mate including an undelayed code bit and a delayed code bit of the same polarity and wherein one code bit comprises an amplified code bit and the other code bit comprises a first amplitude code bit.

5. The method of claim 4 wherein the code bits of said second code mate are of the same polarity as the polarity of the delayed code bit of said first code mate.

6. The method of claim 5 wherein said first code mate includes a first amplitude and undelayed code bit and an amplified and delayed code bit and wherein said second code mate includes an amplified and undelayed code bit and a first amplitude and delayed code bit.

7. The method of claim 5 wherein said first code mate includes a first amplitude and undelayed code bit and an amplified and delayed code bit and wherein said second code mate includes a first amplitude and undelayed code bit and an amplified and delayed code bit.

8. The method of claim 5 wherein said first code mate includes an amplified and undelayed code bit and a first amplitude and delayed code bit and wherein said second code mate includes an amplified and undelayed code bit and a first amplitude and delayed code bit.

9. The method of claim 5 wherein said first code mate includes an amplified and undelayed code bit and a first amplitude and delayed code bit and wherein said second code mate includes a first amplitude and undelayed code bit and an amplified and delayed code bit.

10. The method of claim 5 wherein said first code mate includes an undelayed code bit of negative polarity and a delayed code bit of positive polarity and wherein said second code mate includes code bits of positive polarity.

11. Apparatus for generating a code mate pair of multi-bit digital codes of at least two code bits each, comprising in combination:
   means for generating two separate time coincident code bits of a first amplitude and having a respective first and second polarity;
   means for amplifying one of said two code bits by a predetermined gain having a real number amplitude multiplying factor other than one;
   means for delaying at least one of said code bits by a time delay at least equal to a code bit width of said code bits; and
   means for selectively combining said code bits into a first code mate including an undelayed code bit and a delayed code bit of mutually opposite polarity and wherein one code bit thereof comprises an amplified code bit and the other code bit comprises a first amplitude code bit, and a second code mate including an undelayed code bit and a delayed code bit of the same mutual polarity and wherein one code bit thereof comprises an amplified code bit and the other code bit comprises a first amplitude code bit.

12. The apparatus of claim 11 wherein said code bits of said second code mate are of the same polarity as the delayed code bit of said first code mate.

13. The apparatus of claim 12 wherein said undelayed code bit of said first code mate comprises a pulse of negative polarity and said delayed code bit comprises a pulse of positive polarity, and wherein said code bits of said second code mate comprise respective undelayed and delayed code bits of positive polarity.

14. The apparatus of claim 11 wherein said means for generating said two code bits comprises a pulse generator for generating said code bit of said first polarity and pulse inverter means coupled to said pulse generator for generating said code bit of said second polarity.

15. The apparatus of claim 14 and wherein said amplifying means is coupled to said inverter means for providing an output comprising an amplified code bit of said second polarity,
   wherein said means for delaying includes first time delay means coupled to the output of said amplifying means for providing an output of a amplified and delayed code bit of said second polarity and second time delay means coupled to said inverter means providing an output of a first amplitude and delayed bit of said second polarity, and
   wherein said means for combining includes a first linear adder coupled to said pulse generator and said first time delay means providing an output of a first code mate comprising a first amplitude and undelayed code bit of said first polarity followed by an amplified and delayed code bit of said second polarity, and a second linear adder coupled to said amplifying means and said second time delay means providing an output of said second code mate comprising an amplified and undelayed code bit of said second polarity followed by a first amplitude and delayed code bit of said second polarity.

16. The apparatus of claim 14 wherein said amplifying means is coupled to said pulse inverter for providing an output of an amplified code bit of said second polarity,
   wherein said delaying means comprises time delay means coupled to the output of said amplifying means for providing an amplified and delayed code bit of said second polarity, and
   wherein said means for combining includes first linear adder means coupled to said pulse generator and said time delay means and providing an output of said first code mate comprising a first amplitude and undelayed code bit of said first polarity followed by an amplified and delayed code bit of said second polarity, and second linear adder means coupled to said pulse inverter and said time delay means for providing an output of said second code mate comprising a first amplitude and undelayed code bit of said second polarity followed by an amplified and delayed code bit of said second polarity.

17. The apparatus of claim 14 wherein said means for amplifying is coupled to said pulse generator for providing an output of an amplified code bit of said first polarity, and
   wherein said means for delaying comprises time delay means coupled to said pulse inverter for providing a first amplitude and delayed code bit of said second polarity,
   additionally including second pulse inverter means coupled to said amplifying means for providing an output of an amplified and undelayed code bit of said second polarity, and
   wherein said combining means includes a first linear adder coupled to said time delay means and said amplifying means for providing an output of said first code mate comprising an amplified and undelayed code bit of said first polarity followed by a first amplitude and delayed code bit of said second polarity, and second linear adder means coupled to said time delay means and said second pulse inverter for providing an output of said second code mate comprising an amplified and undelayed code bit of said second polarity followed by a first amplitude and delayed code bit of said second polarity.

18. The apparatus of claim 14 wherein said amplifying means is coupled to said pulse generator means for providing an output of an amplified code bit of said first polarity,
   additionally including a second pulse inverter coupled to said amplifying means for providing an output of an amplified code bit of said second polarity,
   wherein said means for delaying includes a first time delay means coupled to said first recited pulse inverter for providing a first amplitude and delayed code bit of said second polarity and second time delay means coupled to said second pulse inverter for providing an amplified and delayed code bit of said second polarity, and
   wherein said combining means includes first linear adder means coupled to said first time delay means and said amplifying means for providing an output of said first code mate comprising an amplified and undelayed code bit of said first polarity followed by a first amplitude and delayed code bit of said second polarity and a second linear adder means coupled to said first recited pulse inverter and said second time delay means for providing an output of said second code mate comprising a first amplitude and undelayed code bit of said second polarity followed by an amplified and delayed code bit of said second polarity.

* * * * *